United States Patent [19]

Zahn et al.

[11] 4,080,635
[45] Mar. 21, 1978

[54] TENSION CONTROL MECHANISM FOR A RECORDING/REPRODUCING DEVICE

[75] Inventors: Heinrich Zahn, Rossdorf; Ulrich Brauch, Nieder-Beerbach; Gerhard Falk, Rossdorf, all of Germany

[73] Assignee: Robert Bosch GmbH, Darmstadt, Germany

[21] Appl. No.: 688,625

[22] Filed: May 21, 1976

[30] Foreign Application Priority Data

May 22, 1975 Germany ............................ 2522582

[51] Int. Cl.² ............................................ G11B 15/18
[52] U.S. Cl. ................................. 360/71; 242/189; 242/75.3
[58] Field of Search ............................ 360/71, 70, 69; 242/75.3, 75.51, 189, 190

[56] References Cited

U.S. PATENT DOCUMENTS

| | | | |
|---|---|---|---|
| 3,022,960 | 2/1962 | Foster | 242/75.3 |
| 3,091,410 | 5/1963 | Widener | 242/190 |
| 3,405,857 | 10/1968 | Albrecht | 242/75.3 X |
| 3,517,895 | 6/1970 | Kraft | 242/190 |
| 3,539,129 | 11/1970 | Schmidt et al. | 242/189 |
| 3,911,492 | 10/1975 | Uri | 242/190 X |
| 3,969,766 | 7/1976 | Tanaka et al. | 242/189 X |

Primary Examiner—John H. Wolff
Attorney, Agent, or Firm—Ernest F. Marmorek

[57] ABSTRACT

In a recording and reproduction device for a tape-like carrier having at least one scanning device and two spools for the carrier, first and second tape-tension adjusting levers, and first and second guidance devices disposed on the levers, respectively, for guiding and maintaining the carrier thereon, spring devices exerting a force against the levers, and where the levers may be displaced from a rest position to one of a plurality of operating positions against the force of the spring devices, the improvement includes a regulating mechanism for the spring device where the force of the latter has first, second and third regions, which may be controlled by the regulating mechanism. The force for the spring device may be adjusted by the regulating mechanism in the first region to a value sufficient to maintain the carrier on the guidance devices, is adjustable in the second region to a second value required for selective recording and reproduction of the carrier, and may be adjusted in the third region to a value at least equal to a value required for fast rewinding of the carrier, but below a predetermined maximum allowable value that if obtained, would result in a permanent deformation of the tape-like carrier.

6 Claims, 3 Drawing Figures

TENSION CONTROL MECHANISM FOR A RECORDING/REPRODUCING DEVICE

The invention relates to a recording-, and/or reproduction-device for tape-like record supports, consisting of at least one scanning device and two tape-spools, whereby the tape-like record support (tape) is guided between the scanning device and the tape-spools via one guide-device each, which is mounted on a tape-draw-lever, and whereby the tape-draw-levers are deflected by the tension of the tape from a state of rest in opposition to a spring tension.

In the cases of devices of the initially mentioned type, tape-tension adjusting levers are used on the one hand to measure the tape tension and, on the other hand, are used to obtain a balance between the scanning device and the tape spools, since differences in the moving-, and acceleration-behaviour exist between these components of the device.

Furthermore, in the cases of the tape-devices two operating conditions can be distinguished: normal run (for recording and reproduction) and fast rewinding.

SUMMARY OF THE INVENTION

In a recording and reproduction device for a tape-like carrier having at least one scanning device and two spools for the carrier, first and second tape-tension adjusting levers, and first and second guidance devices disposed on the levers, respectively, for guiding and maintaining the carrier thereon, spring means exerting a force against the levers, and wherein the levers may be displaced from a rest position to one of a plurality of operating positions against the force of a spring means, the force having a first value sufficient to maintain the carrier on the guidance devices, a second value for selective recording and reproduction of the carrier, and a third value for faster rewinding of the carrier, the improvement includes, in combination, a regulating means for the spring means, wherein the force of the spring means has first, second and third regions. These regions may be controlled by the regulating means and the force of the spring means may be adjusted by the regulating means in the first region to the first value, in the second region to the second value, and may be adjusted in the third region to a value at least equal to the third value, but below the second value.

The recording and reproduction device preferably includes first, second and third pre-stressed tension springs and wherein the displacement of the first spring is limited to a first predetermined value, and the second and third springs are jointly displaceable to a second predetermined value; the displacement of the tape-tension adjusting levers is limited to a third predetermined value.

It is preferable if the device includes an intermediate lever which connects the second and third springs, and wherein each of the latter springs has a direction of elongation; the directions of elongation are displaced from one another substantially perpendicularly.

Each of the tape-tension adjusting levers preferably includes a first axle attached to one of the guidance devices, and where the lever is pivotably mounted on the first axle; the regulating means preferably includes a pin rigidly mounted on the device and formed with a borehole. The spring means preferably include a first spring having one end wrapped around the pin, and a stud attached with one end thereof to the other end of the first spring, passing through the borehole, and carrying stop means on the other end thereof for abutting the pin upon tension being exerted upon the first spring. A second axle is preferably rigidly attached on the device and an intermediate lever may be pivoted about the second axis; a second spring preferably interconnects the first spring and the intermediate lever, and a third spring is connected between the intermediate lever and the tension-adjusting lever.

The regulating means preferably includes a stationary pin which is rigidly attached to the recording and reproducing device, and the intermediate lever is adapted to abut against the stationary pin.

The second and third springs are preferably connected to the intermediate levers at first and second suspension locations, respectively, the suspension locations being selected so that upon an increasing deflection of the tension-adjusting lever the leverage exerted by the third spring is exceeding the leverage exerted by the second spring.

The stud is preferably threaded, and the stop means includes two nuts which are lockingly screwed onto the threaded stud.

The device preferably includes a switch which is mounted rigidly on the recording and reproducing device and yields a switching signal upon the intermediate lever abutting and contacting the switch.

BRIEF DESCRIPTION OF THE DRAWINGS

For a fuller understanding of the nature and objects of the invention, reference should be had to the full and detailed description, taken in connection with the accompanying drawings in which.

DESCRIPTION OF THE PREFERRED EMBODIMENTS

Figure 1:
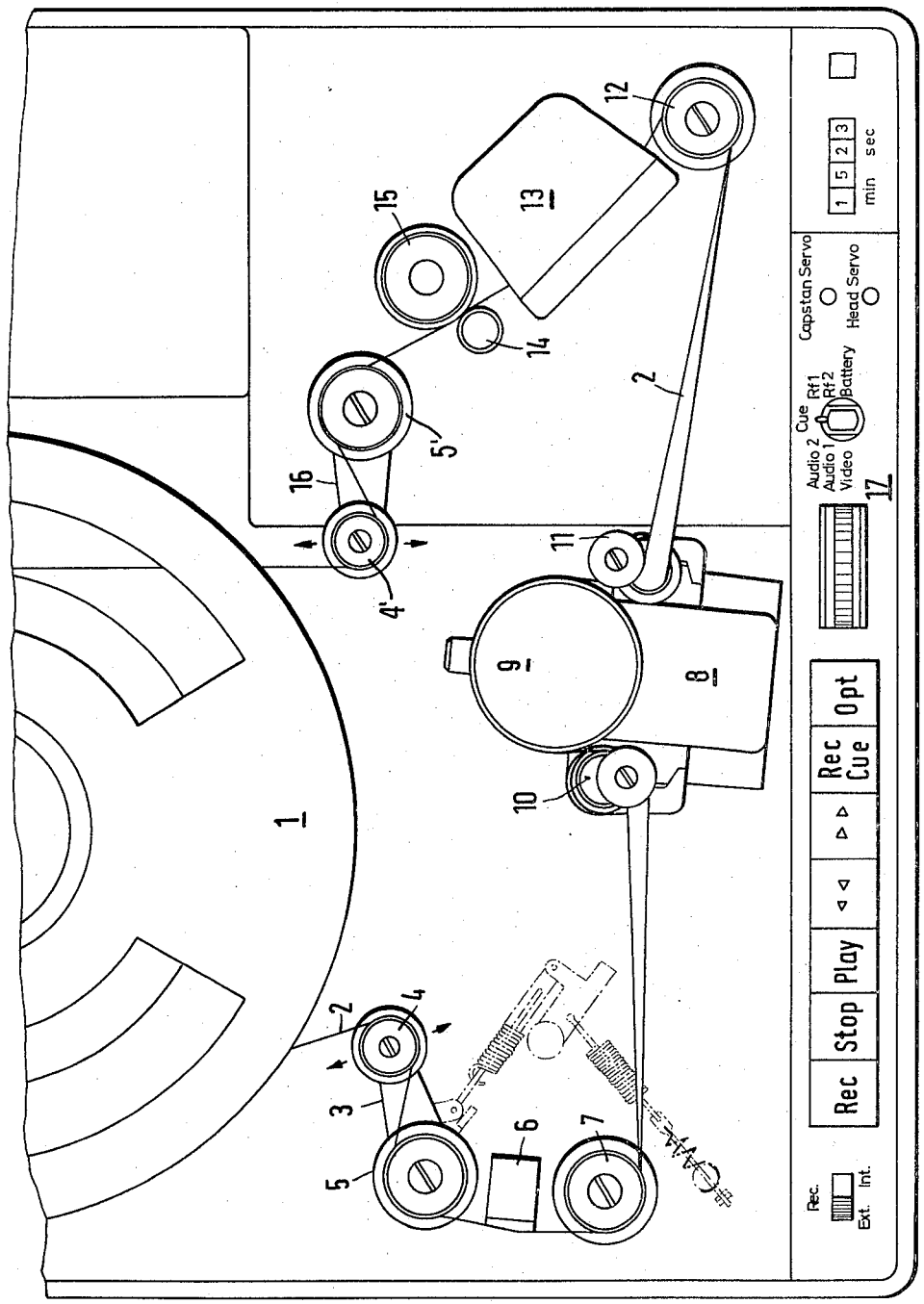
FIG. 1 shows a recording and reproduction device with the invention installed therein.

In carrying the invention into effect in the schematized rendering of a video-magnetic-tape device according to FIG. 1, the tape spools are arranged concentrically on top of one another, so that solely the take-up spool 1 is visible. The magnetic tape 2 is unwound from the storage spool 1 and is guided around a first tape-tension adjusting lever 3, which is provided with guide-rollers or guidance devices 4 and 5. Following an erase-head 6 there is disposed another guide-roller 7. The recording or scanning of the recorded signals takes place in the scanning device 8, which consists of a cylindrical body 9. The head-wheel, which is arranged therein in a known manner, is not essential for the understanding of the present invention and is therefore not illustrated in any particular manner. Furthermore, guide-rollers 10 and 11 are part of the scanning device 8.

After the tape 2 has passed the scanning device 8, it arrives at the take-up spool 1, via an additional guide-roller 12, additional magnetic heads 13, the tape-transport-roller 14 with the corresponding pressure roller 15 and an additional tape-tension adjustment lever 16.

As it is customary in the cases of devices of this type, a series of control elements 17 are provided.

In a known manner, a control-system provides for the necessary tape-tension required for different operating conditions. Thus, example, the position of the tape-tension adjusting levers 3 and 16 is converted into electrical quantities which control the moment of rotation of the drive-, or braking-devices of the spools.

Figure 2:
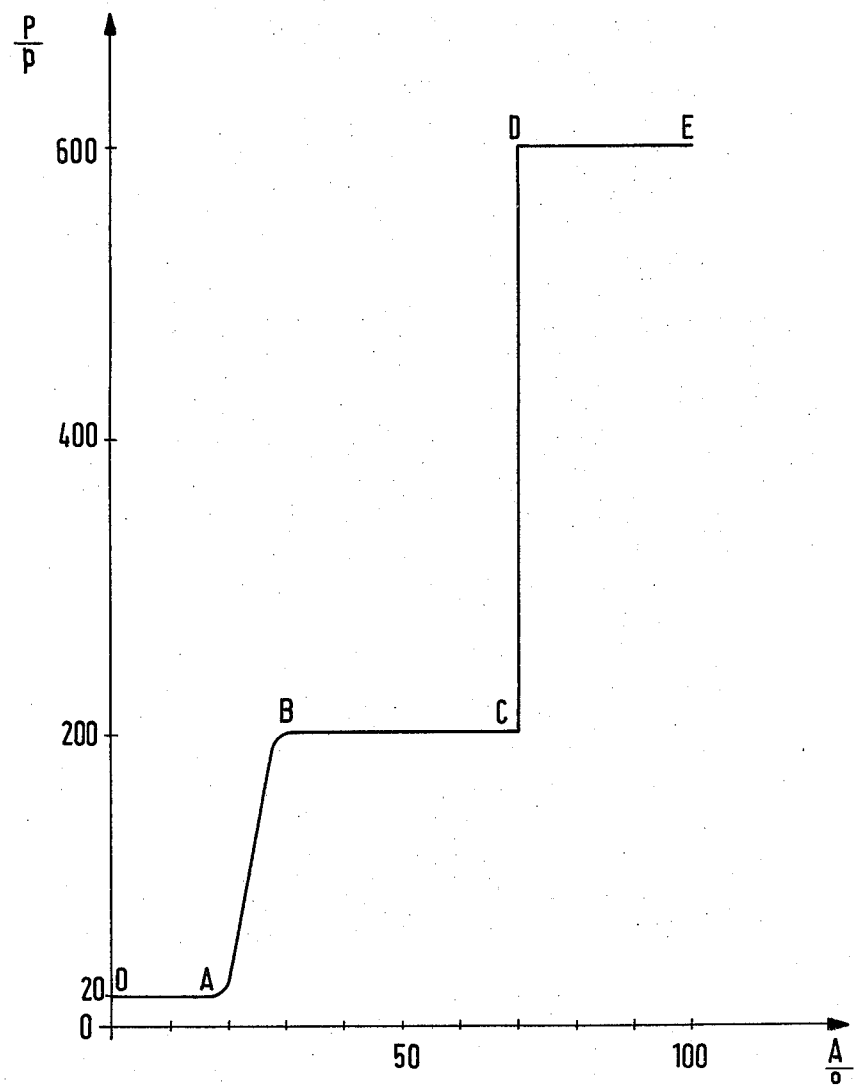
FIG. 2 shows the tension in the device as a function of the position or deflection of the tension-adjusting lever.

In the following, the operation of such a type of control system in conjunction with a characteristic curve of the spring tension according to the invention, as illustrated in FIG. 2, will be explained.

During normal operation, that is to say during recording and reproduction, the rate of speed of the magnetic tape 2 is determined by the tape-transport-roller 14. The required tape-tension is adjusted in each case for the portion of the tape disposed ahead of the tape-transport-roller 14 and for the portion of the tape following the tape-transport-roller 14, this being achieved through one tape-tension adjusting lever each and through the corresponding spool-drive. The tape-tension at the scanning-unit 8 is vertical for the faultless functioning of the apparatus. This tape-tension is adjusted through the tape-tension adjusting lever 3. Based on the path of force shown in FIG. 2, and through the intervention of a control circuit known itself, the tape-tension adjusts itself to 200 p. If disturbances of the control circuit occur, the displacement of the tape-tension adjusting lever moves between points B and C (FIG. 2), without the tape-tension being changed materially. The tape-tension adjusting lever 16 likewise works in similar manner together with the drive of spool 1.

If the device is switched, for example, to "fast forward motion", the pressure exerted by the pressure-roller 15 is removed from the tape-transport 14. At the same time, the drive of spool 1 is switched to the highest available output speed thereon the drive for the storage-spool, now as before, is controlled in corresponding with the position of the tape-tension adjusting lever 3 for an instability of the control-system would result through an additional adjustment with the aid of the tape-tension adjusting lever 16. However, since due to the increased tape-tension of spool 1, the tape-tension adjusting lever 16 is brought into position C, the changes in tension do not make themselves felt. In the case of the characteristic curve of the spring tension shown in FIG. 2, the tape-tension exerted which is by the spool 1, at a "fast forward motion" , should have a value lower than 600 p.

If the tape-tension should temporarily increase by an order of magnitude, then the tape-tension adjusting lever 16 can be still displaced somewhat further, or move within the range between points D and E of the characteristic curve of the spring tension, without the tape being exposed to inadmissibly high stresses and strains.

When switching from one operating state to another operating state, a relatively large quantity of tape may also be located at the region between the spools, so that the tape-tension falls below an order of magnitude provided for normal operation. In this case, the tape-tension adjusting levers still yield to such an extent, that a displacement of the tape from the tape-guidance-devices is avoided with certainty. For this purpose, the region which is located between points 0 and A of the characteristic curve of the spring tension shown in FIG. 2, is provided.

Figure 3:
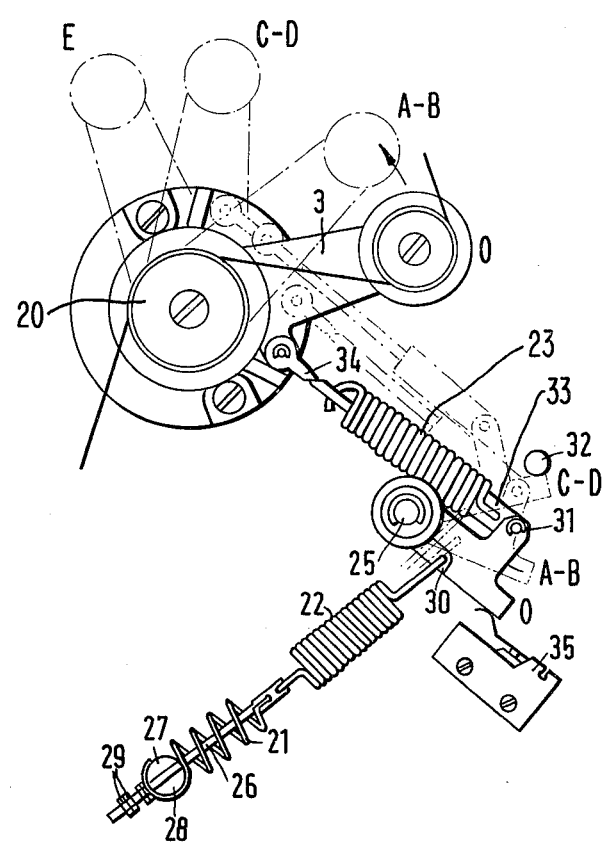
FIG. 3 shows the tape-tension adjusting lever, according to the present invention.

FIG. 3 shows an exemplified embodiment of the spring-system which in accordance with FIG. 1, moves the tape-tension adjusting lever 3.

The tape-tension adjusting lever 3 is mounted in a rotatable manner around an axle 20. The spring-system consists of tension-springs 21, 22 and 23. If the tape-tension adjusting lever 3 is now moved by the tape in the direction of the arrow, this movement is then transferred from spring 23 to an intermediate lever 24, which is pivotably mounted around an axle 25. Through this action, the combination consisting of springs 21 and 22 is drawn apart so that, to begin with, spring 21 yields or extends. For the limitation of the displacement or compensation of spring 21, a stud 26 is provided within this spring, so that this stud is guided through a borehole 27 of a pin 28 in a movable manner and at its extremity displays a screw thread and two nuts 29. As soon as these nuts abut against the bolt 28, the latter being rigid with the frame of the recording- and/or reproduction device, point A in Fig. 2 is reached.

The spring 22 is prestressed and, at the point B) begins to be deflected. So that the curve does not ascend further between the points B and C, the points of suspension 30 and 31, at which the springs apply their forces, respectively, on the intermediate lever 24, are selected in such a manner so that, with increasing deflection, the effective portion of the lever becomes greater for the spring 23 and smaller for the spring 22.

On reaching point C (FIG. 2), the intermediate lever 24 abuts against a stationary pin 32.

For any further movement of lever 3 it is necessary to overcome the initial stress of spring 23. This initial stress can be achieved by two suspension elements 33 and 34 for spring 23 against abutting one another within the interior of spring 23, the spring 23 being already in a stressed conditioned.

Finally, FIG. 3 also shows a switch 35, which provides a switching signal, as soon as the final position of the tape-tension adjusting lever 3 is attained.

We claim:

1. In a recording and reproduction device for a tape-like carrier having at least one scanning device and two spools for the carrier, first and second tape-tension adjusting levers, and first and second guidance devices disposed on said levers, respectively, for guiding and maintaining the carrier thereon, spring means exerting a force against said levers, the levers being displaceable from a rest position to one of a plurality of operating positions against the force of the spring means, the force having a first value sufficient to maintain the carrier on the guidance devices, a second larger value for selective recording and reproduction of the carrier, and a third largest value for fast rewinding of the carrier, the improvement comprising, in combination:

tape-tension adjusting means for the spring means, wherein the force of the spring means has first, second and third deflection regions, controllable by said tape-tension adjusting means, the force of said spring means being adjustable by said tape-tension adjusting means in said first region to said first value, being adjustable, in said second region to said second value, and being adjustable in said third region to said third value, said third value being below a predetermined maximum allowable value that, if attained, would result in a permanent deformation of said tape-like carrier, said spring means comprising first, second and third pre-stressed tension springs, wherein the displacement of said first spring is limited against a force having said first value, wherein said second and third springs are jointly displaceable against a force having said second value, and wherein the displacement of the tape-tension adjusting levers at their extreme positions is limited against a force having said third value.

2. The recording and reproduction device according to claim 1, further comprising an intermediate lever connecting said second and third springs, each of said second and third springs having a direction of elongation, said directions being displaced from one another substantially perpendicularly.

3. The recording and reproduction device according to claim 1, wherein each of said tape-tension adjusting levers comprises a first axle attached to one of said guidance devices, the lever being pivotably mounted on said first axle, and wherein said tape-tension adjusting means includes a pin rigidly mounted on said device and formed with a borehole, said spring means including a first spring having one end wrapped around said pin and a stud attached with one end thereof to the other end of said first spring, passing through said borehole, and carrying stop means on the other end thereof for abutting said pin upon tension being exerted upon said first spring, a second axle rigidly attached on said device, an intermediate lever pivotable about said second axle, a second spring interconnected between said first spring and said intermediate lever, and a third spring connected between said intermediate lever and one of said tension-adjusting levers.

4. The recording and reproducing device according to claim 3, wherein said tape-tension adjusting means further includes a stationary pin rigidly attached to said recording and reproducing device, said intermediate lever being abuttable against said stationary pin.

5. The recording and reproducing device according to claim 3 wherein said second and third springs are connected to said intermediate lever at first and second suspension locations, respectively, the suspension locations being selected so that upon an increasing deflection of said one of said tension-adjusting levers the leverage exerted by said third spring is exceeding the leverage exerted by said second spring.

6. The recording and reproducing device according to claim 3, wherein said stud is threaded, and said stop means includes two nuts lockingly screwed onto the threaded stud.

* * * * *